(12) United States Patent
Chapman

(10) Patent No.: US 8,757,900 B2
(45) Date of Patent: Jun. 24, 2014

(54) BODY-MOUNTED CAMERA CRANE

(71) Applicant: Chapman/Leonard Studio Equipment, Inc., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 13/890,444

(22) Filed: May 9, 2013

(65) Prior Publication Data

US 2014/0064720 A1    Mar. 6, 2014

Related U.S. Application Data

(60) Provisional application No. 61/712,357, filed on Oct. 11, 2012, provisional application No. 61/693,889, filed on Aug. 28, 2012.

(51) Int. Cl.
*G03B 17/56* (2006.01)
*F16M 13/04* (2006.01)

(52) U.S. Cl.
CPC ............. *G03B 17/561* (2013.01); *F16M 13/04* (2013.01)
USPC .......................................... 396/421; 396/423

(58) Field of Classification Search
CPC ....... G03B 17/56; G03B 7/561; F16M 13/041
USPC .................................................. 396/420–423
See application file for complete search history.

(56) References Cited

U.S. PATENT DOCUMENTS

| | | | |
|---|---|---|---|
| 2,552,205 A * | 5/1951 | Moss | 224/259 |
| 2,945,428 A * | 7/1960 | Dearborn | 396/421 |
| 4,037,763 A * | 7/1977 | Turchen | 224/153 |
| 4,158,490 A | 6/1979 | Gottschalk et al. | |
| 5,462,214 A | 10/1995 | Buswell | |
| 6,056,449 A | 5/2000 | Hart | |
| 6,611,662 B1 * | 8/2003 | Grober | 396/55 |
| 7,794,160 B1 * | 9/2010 | Arthur | 396/421 |
| 2010/0040360 A1 * | 2/2010 | Scott | 396/428 |
| 2011/0080564 A1 | 4/2011 | Taylor | |
| 2013/0094847 A1 * | 4/2013 | Di Leo | 396/421 |

OTHER PUBLICATIONS

Korean Intellectual Property Office, "The International Search Report and The Written Opinion of the International Searching Authority, or the Declaration" mailed Dec. 10, 2013.

* cited by examiner

*Primary Examiner* — W B Perkey
(74) *Attorney, Agent, or Firm* — Kenneth H. Ohriner; Perkins Coie LLP

(57) ABSTRACT

A body-mount camera crane includes a camera platform pivotally attached to the front ends of the left and right tubes and an accessory platform pivotally attached to the back ends of the left and right tubes. A hip belt is pivotally attached to the left and right tubes at an intermediate position. In use, the crane is supported largely on the operator's hips via the hip belt. The elevation of the lens is changed by pivoting the crane up and down. The operator correspondingly pivots the camera platform to keep the camera level. Alternatively a parallelogram linkage keeps the camera platform level. The length of the tubes may be adjusted based on the weights of the camera and the accessories, such as batteries, on the accessory platform, to keep the crane balanced.

20 Claims, 15 Drawing Sheets

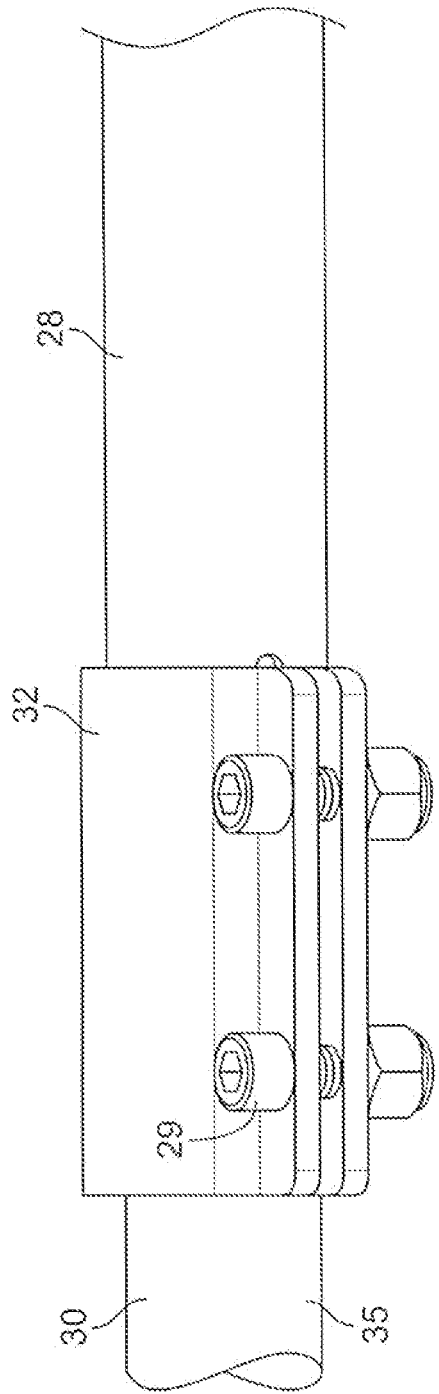
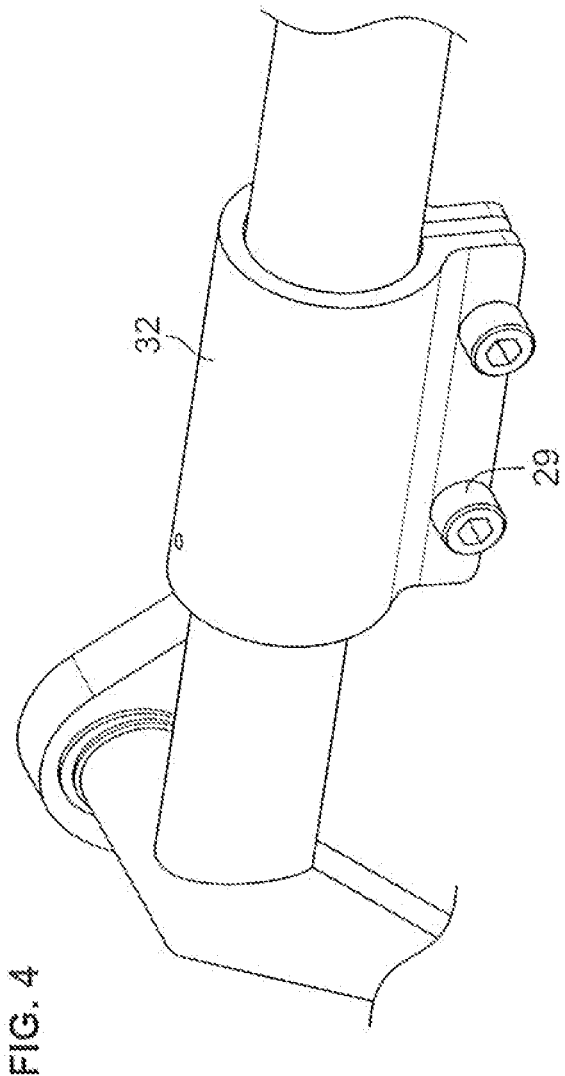

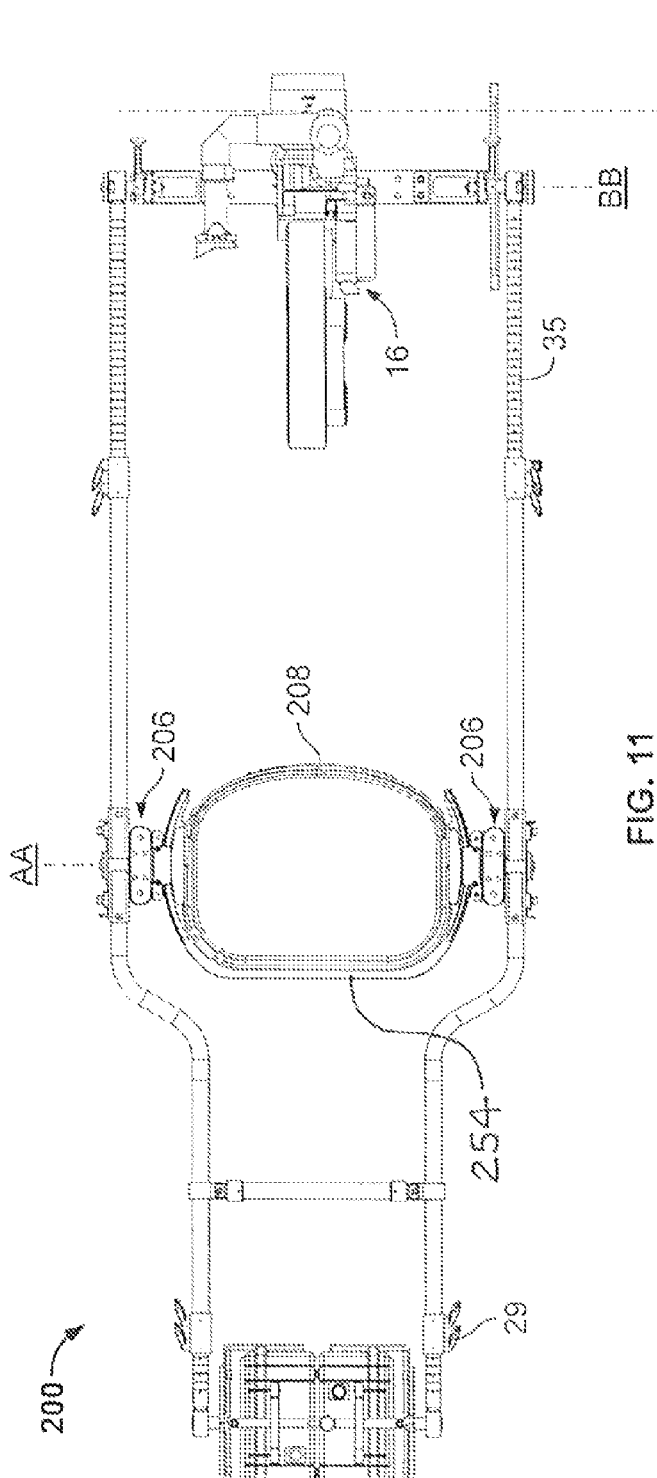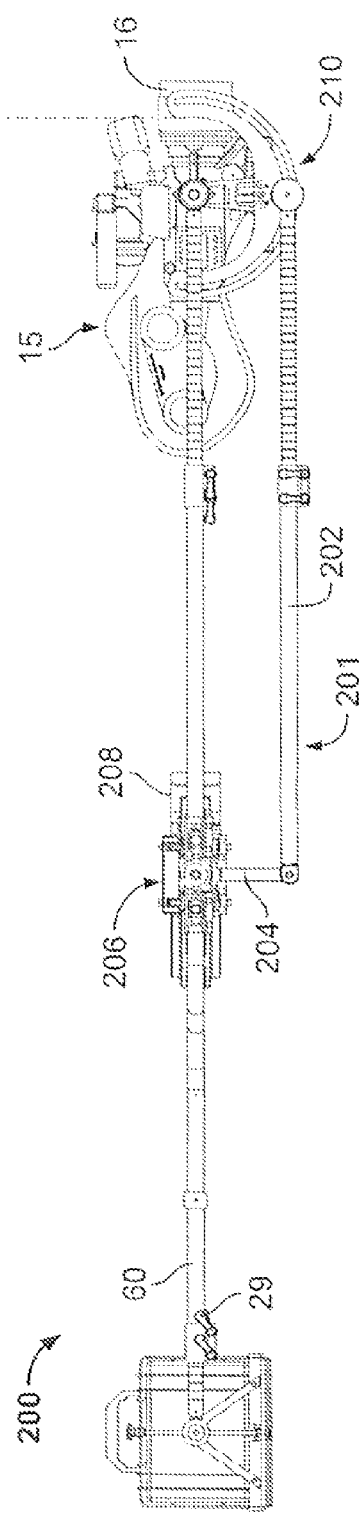
FIG. 11
FIG. 12

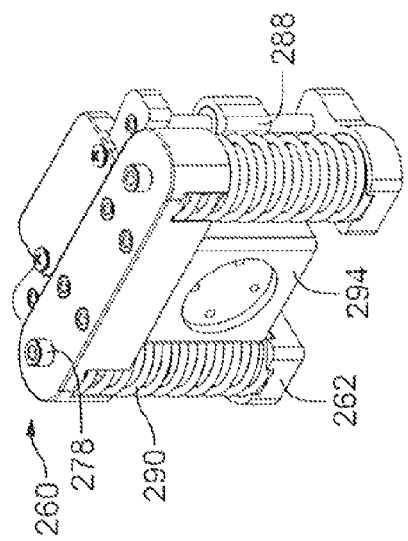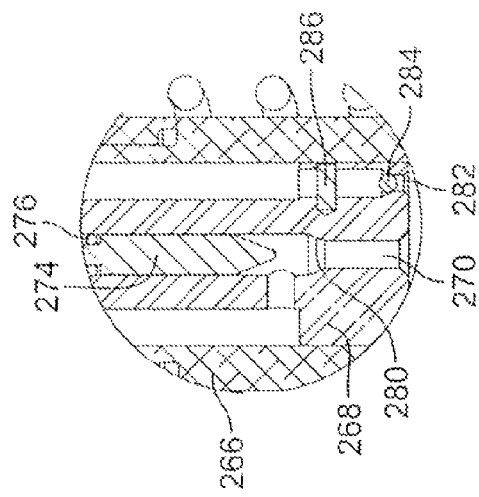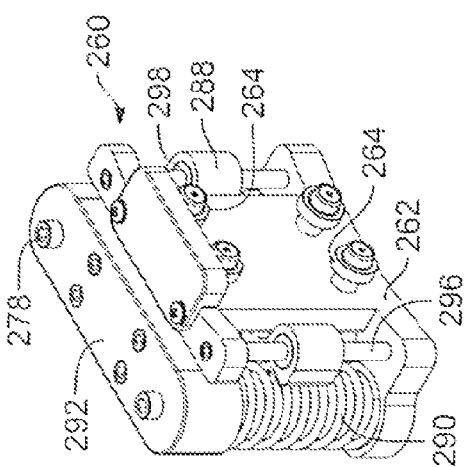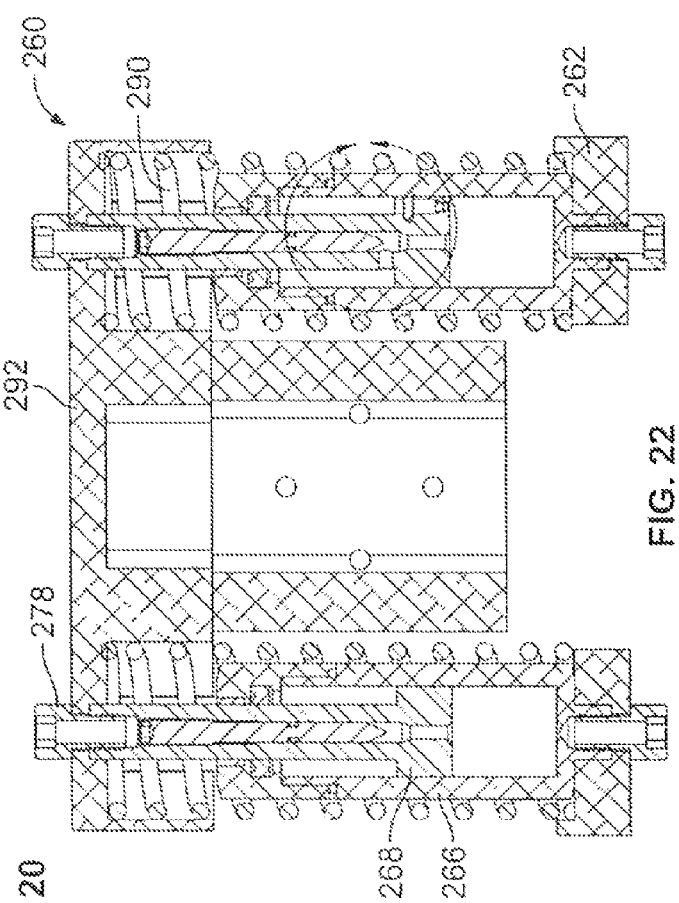

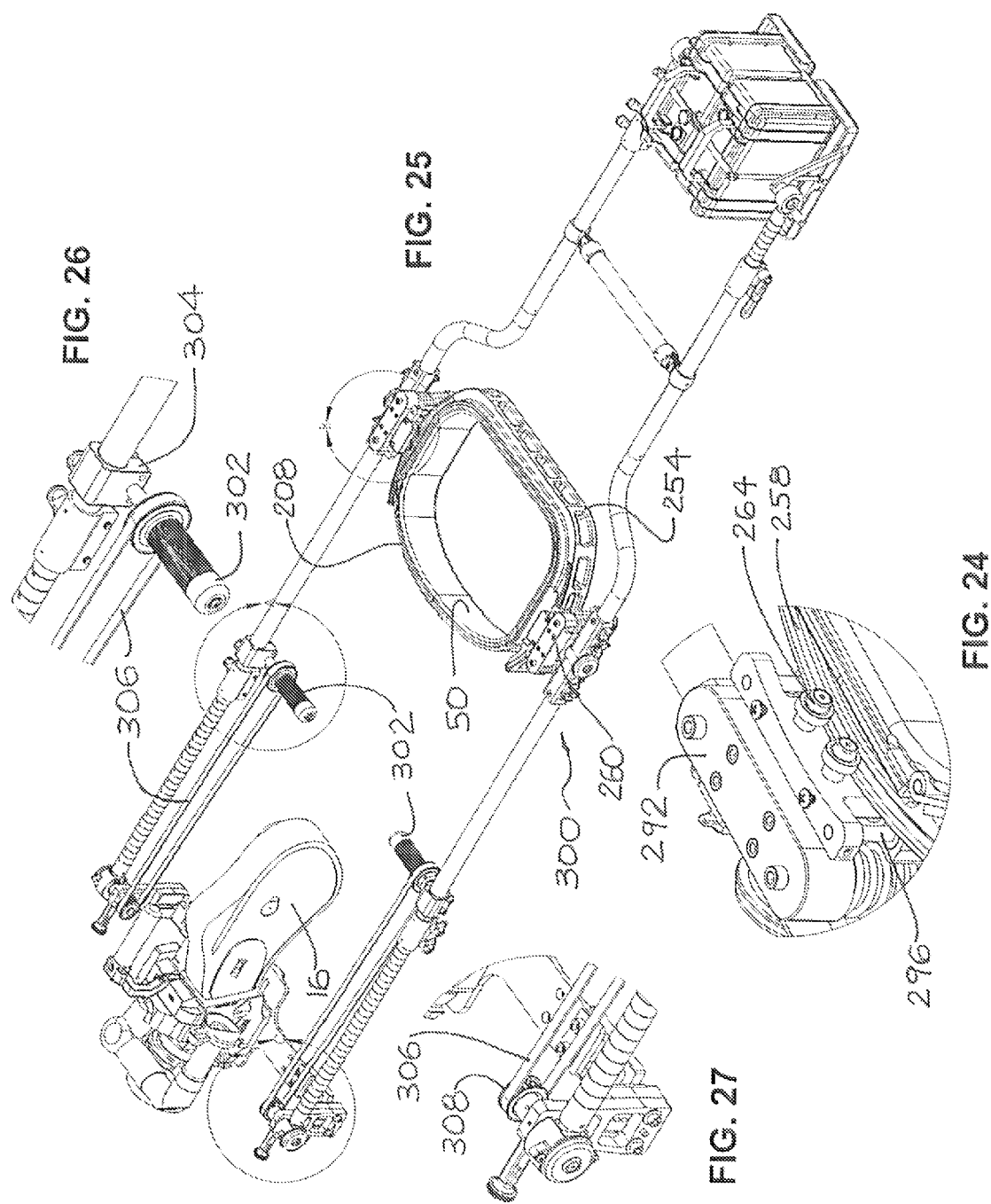

BODY-MOUNTED CAMERA CRANE

This application claims priority to U.S. Provisional Application Nos. 61/712,357 filed Oct. 11, 2012 and 61/693,889 filed Aug. 28, 2012, both incorporated herein by reference.

BACKGROUND OF THE INVENTION

In motion picture, television and video filming, it is often necessary for the camera operator to manually carry the camera, to follow a desired action sequence or to obtain a desired camera angle. Various body-mounted camera supports have been provided for this purpose, such as the well known Steadycam® system. Typically, with these types of systems, the camera is supported on a gimbal with springs and dampening elements used to provide smooth movements and neutral buoyancy. The system is attached to a harness on the operator. The camera and the supporting system stay close in to the operator's body, with the objective of providing a stable camera platform, while the operator is walking or running. So-called pole-cam systems support a camera on the end of a long pole which extends through a fitting on a harness worn by the operator. The pole is counterbalanced and may allow the camera to be held out several meters away from the operator. These types of systems provide an extended reach but provide little or no stabilizing function. Various other body-mounted camera support systems have also been proposed.

While these types of body-mounted camera support systems have been used with varying degrees of success, disadvantages remain. For example, these body-mounted camera support systems may require a high degree of skill, and/or physical strength, to properly operate. They may also be designed to achieve only a limited range of movements and positions. In addition, generally with these types of systems, a large fraction of the load of the camera and the system itself is carried on the operator's shoulders and back. This can lead to operator fatigue, and also make it more difficult to maneuver the camera as desired.

SUMMARY OF THE INVENTION

A hip or body-mounted camera crane includes a camera platform pivotally attached to the front ends of the left and right tubes and an accessory platform pivotally attached to the back ends of the left and right tubes. A hip belt is pivotally attached to the left and right tubes at an intermediate position. In use, the weight of the crane may be carried on the operator's hips via the hip belt. The elevation of the lens is changed by pivoting the crane up and down. The operator may correspondingly pivot the camera platform to keep the camera level, or a parallelogram linkage may be used to provide automatic leveling.

A monitor screen on the crane, or monitoring eyewear may be used to allow the camera operator to monitor and adjust the lens position. The length of the tubes may be adjusted based on the weights of the camera and the accessories, such as batteries, on the accessory platform, to keep the crane balanced. Fluid dampeners may be used and optionally made adjustable to improve the camera operator's control of the movement of the camera crane.

BRIEF DESCRIPTION OF THE DRAWINGS

FIG. 4 is an enlarged detail view of the telescoping front section of the tubes shown in FIGS. 1-3.

FIG. 5 is an enlarged perspective detail view of an alternative design where the accessory platform is rigidly attached at the back ends of the tubes.

FIG. 11 is a plan view of the design shown in FIG. 10.

FIG. 12 is a side view of the design shown in FIGS. 10 and 11.

FIG. 16 is a partial outside perspective view of the drop down plate shown in FIG. 10.

FIG. 17 is a partial inside perspective view of the drop down plate shown in FIG. 16.

FIG. 20 is a top and inside perspective view of the vertical shock and vibration isolator shown in FIGS. 10 and 12.

FIG. 21 is a top and outside perspective view of the isolator shown in FIG. 18.

FIG. 22 is a section view of the isolator shown in FIGS. 18-19.

FIG. 23 is an enlarged detail section view of the fluid dampener shown in FIG. 20.

FIG. 24 is an enlarged detail perspective view of the rollers of the dampener shown in FIG. 20 rolling on the track of the belt frame shown in FIGS. 10-12.

FIG. 25 is a rear, top and left side perspective view of another alternative design similar to the design of FIGS. 10-12 and further including camera platform tilt handles.

FIG. 26 is an enlarged detail perspective view of the tilt handle shown in FIG. 25.

FIG. 27 is an enlarged detail perspective view of the pulley shown in FIG. 25.

DETAILED DESCRIPTION

Figure 1:
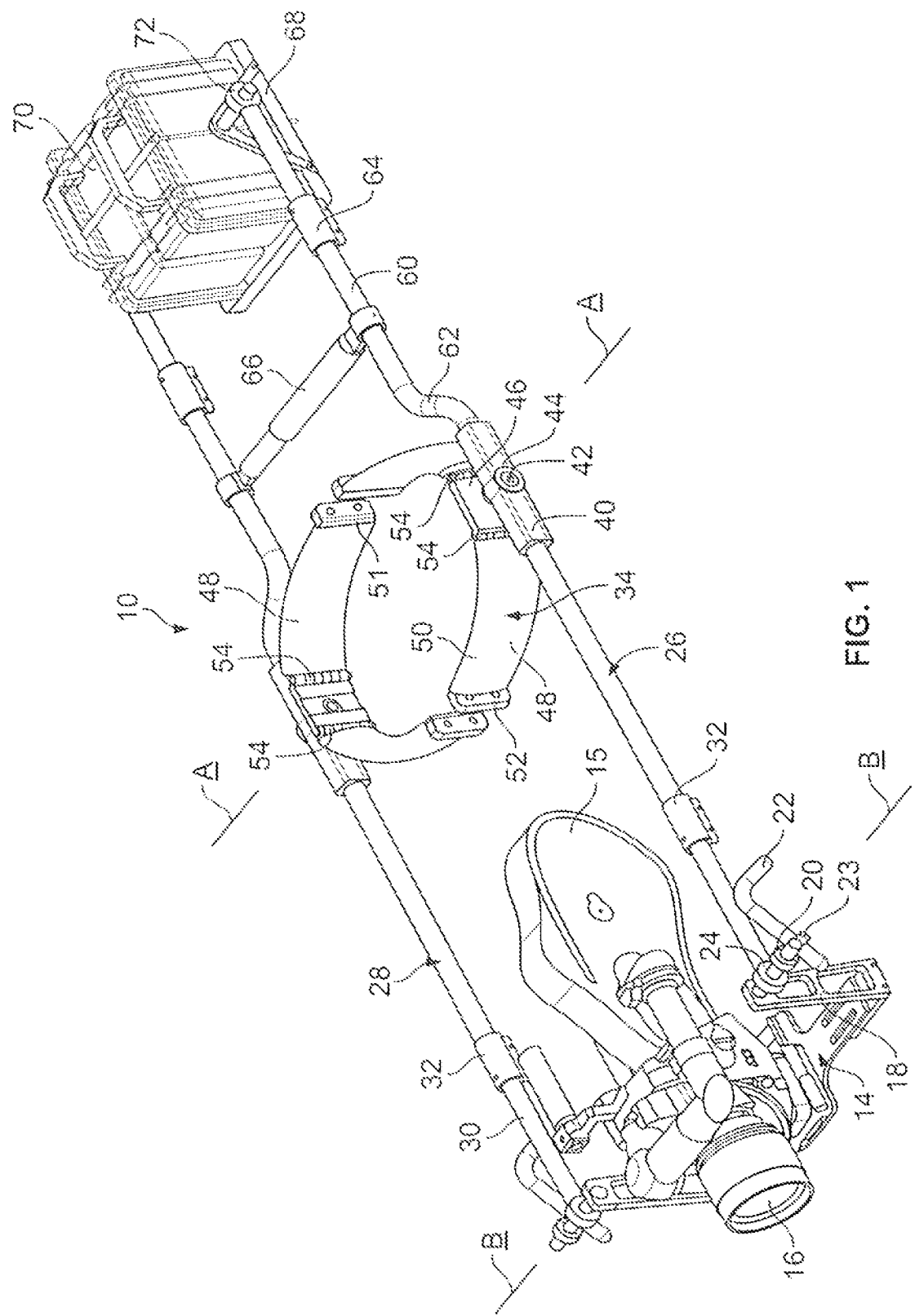
FIG. 1 is a perspective view of a body-mounted camera crane.
Figure 2:
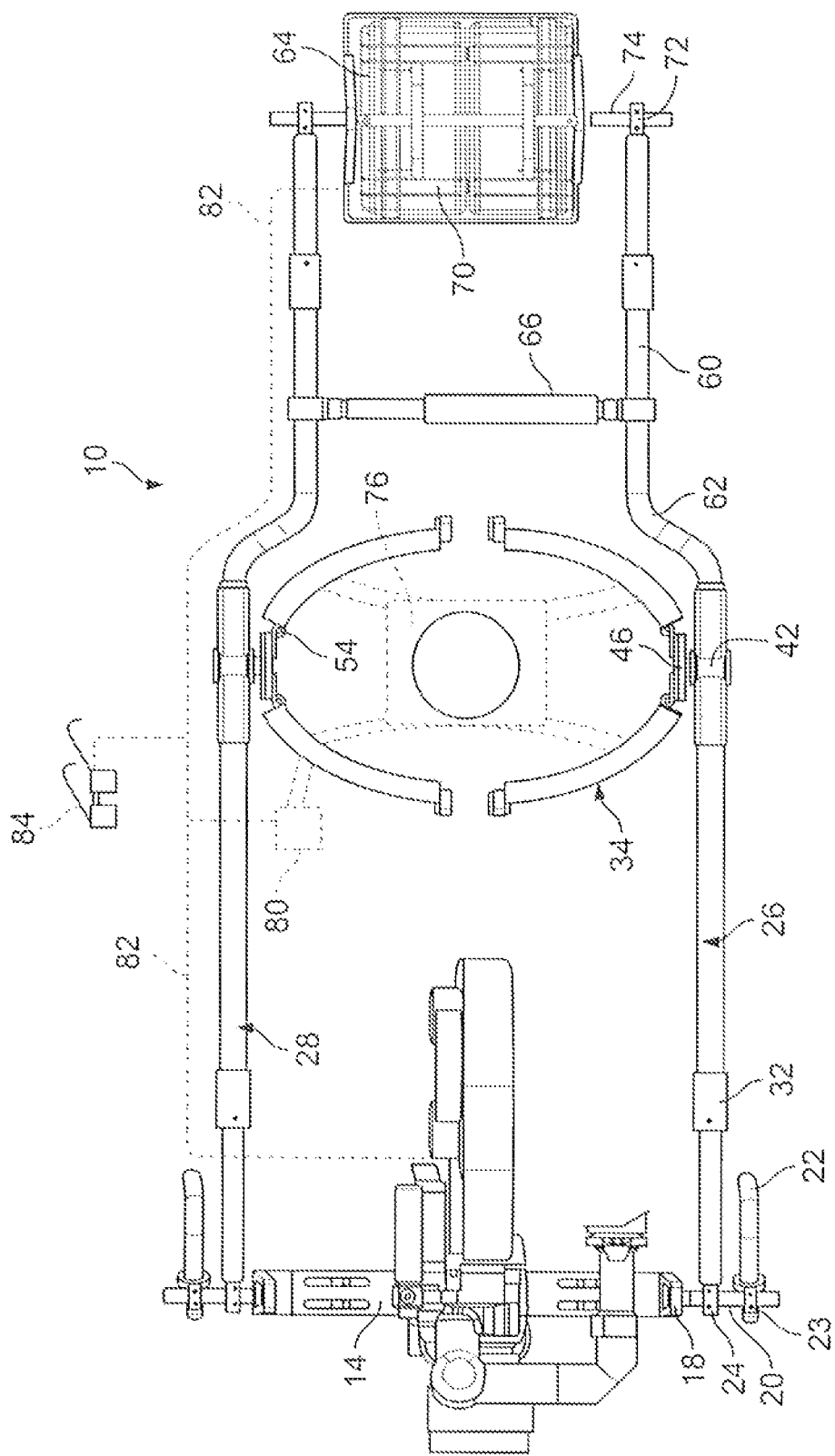
FIG. 2 is a plan view of the body-mounted camera crane shown in FIG. 1.

As shown in FIGS. 1 and 2, a body-mounted camera crane or jib arm 10 includes left and right tubes 26 and 28. A camera platform 14 is pivotally attached to the front ends of the tubes. An accessory or battery platform 60 is pivotally attached to the back ends of the tubes. A hip belt 34 is pivotally attached to the tubes at approximately a mid-point on the tubes. The crane may be symmetrical about a longitudinal centerline. Consequently, for purposes of explanation, the left side components are expressly described, with it understood that the right side components are mirror images of the left side components, except when otherwise stated.

Figure 6:
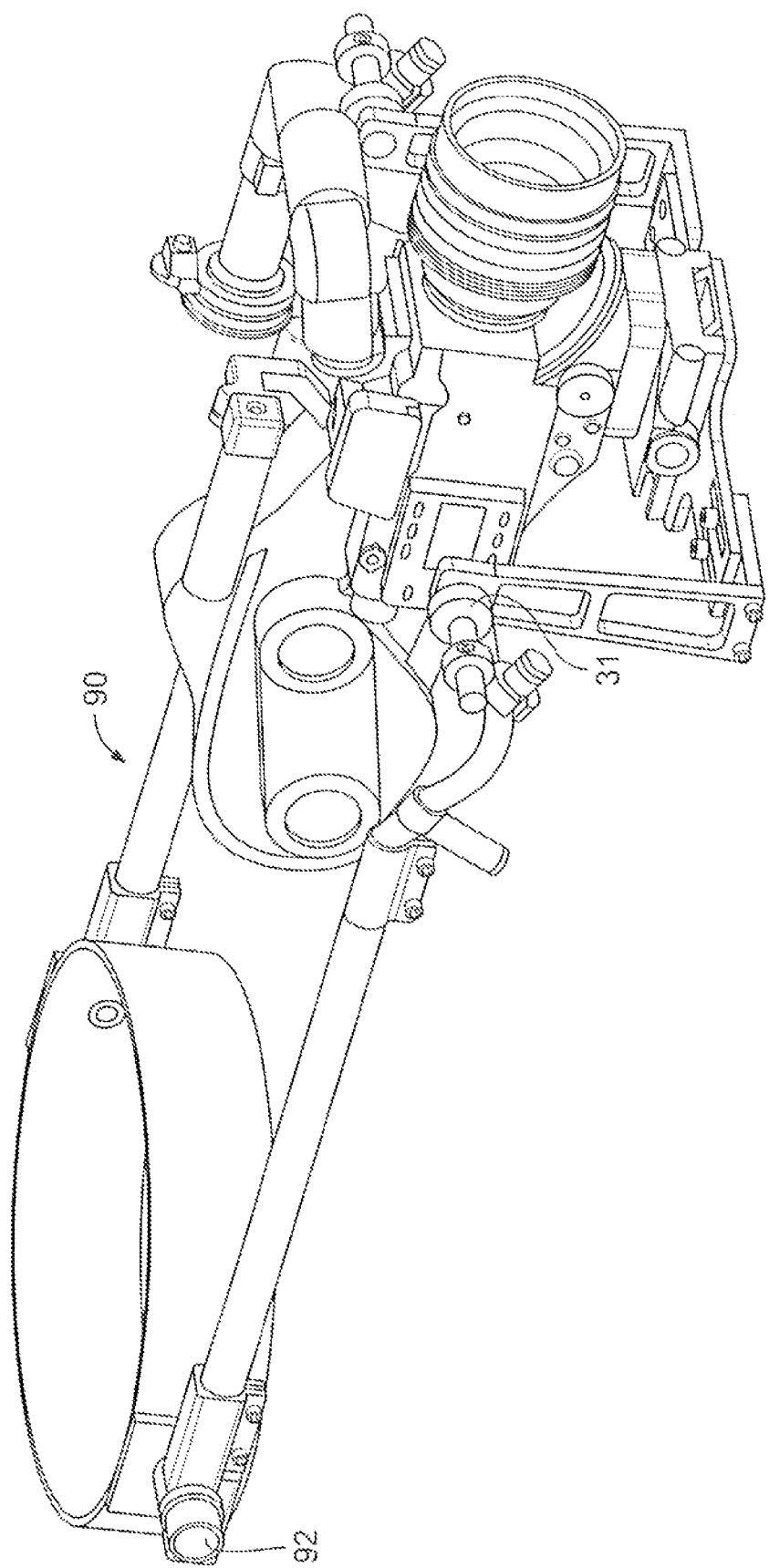
FIGS. 6 and 7 are perspective views of alternative designs.

A camera 15 having a lens 16 is attached onto a base plate of a camera platform 14. Platform arms 18 may be used to attach the camera platform 14 to the tubes. In this case, the arms 18 may extend up at the left and right sides of the base plate. A tilt shaft 20 then extends laterally outwardly from the arm 18 through a front bearing collar 24. This allows the camera platform 14 to tilt relative to the tubes 26 and 28. A viscous dampener 31 may optionally be provided in any of the embodiments as part of the front bearing collar 24, or as a separate component, if used, as shown in FIG. 6. Tilt handles 22 may be attached to the tilt shafts 20, to allow the operator to easily grasp and tilt the camera platform 14. The handles 22 may be adjustable via a clamp fitting 23 shown in FIG. 1, to allow the position and angle of the handle to be changed. The front bearing collars 24 may also slide laterally on the tilt shaft. This allows the lateral spacing of the tubes to be adjusted to accommodate operators having different hip dimensions.

Each tube 26 and 28 may have a telescoping front section 30 and an adjustor 32, to allow the distance between the hip belt 34 and the camera platform 14 to be changed. As shown in FIG. 4, the adjuster 32 may be a tube clamping style adjuster using one or more fasteners or clamps 29. Alternatively the adjuster 32 may use a threaded collar that compresses the outer tube against the inner tube, as the collar is turned. Numbered scale markings 35 may be provided on the front and/or rear inner tubes to provide a visual indicator of the positions of the camera platform and/or the accessory platform, relative to the elevation axis AA shown in FIG. 1.

Each tube 26 and 28 may also have a tube housing 40 and a rear section 60 optionally having an inward joggle 62. The rear section may also be telescopically adjustable to change the dimension between the hip belt 34 and the accessory platform 68, similar to the front section. A lateral tie bar 66 having an adjustable length may optionally be attached to the rear section 60 of the tubes, as shown in FIG. 1.

The hip belt 34 is pivotally attached to the tube housing 40 on each tube. On each of the left and right sides, the hip belt 34 may include front and back rigid shells 48 pivotally attached to an axle plate 46. An axle 42 extends out from the axle plate 46 into an axle bearing 44 in the tube housing 40. Each hip shell 48 may be provided as a curved rigid metal segment or plate, with a pad material 50 to provide a comfortable fit on the operator's hips. A front latch 52 secures and releases the front hip shells 48. Optionally a rear latch may be provided on the rear hip shells 48. The hip shells 48 may be attached to the axle plates 46 via hinges 54. A back section or plate 51 of the hip belt may be rigid element or plate, to help the belt remain level on the user's hips and to keep the left and right side tubes parallel. A shoulder harness 76, shown in dotted lines in FIG. 2, may optionally be attached to the hip belt 34 or to the tubes, as a back-up support, and/or to transfer a fraction of the crane weight onto the operator's shoulders, if desired.

In use, the length of the tubes 26 and 28 may be adjusted depending on the intended use. For example, where high or low lens positions are needed, the tubes may be fully extended to a maximum length (measured between the centers of the front bearing collars 24 and the back bearing collars 72) of about 48 to 90 inches. In contrast, where the camera must be moved through confined spaces, such as a narrow hallway, the tubes can be telescopically collapsed into a shorter length, allowing the operator to turn the crane within a smaller space. As shown in FIG. 5, in some designs the back bearing collars 72 may be omitted, with the accessory platform rigidly attached onto the back ends of the tubes.

The camera 15 is attached to the camera platform 14 and batteries 70 and/or other accessories are mounted on the accessory platform 68. If the weight on the camera platform is different from the weight on the accessory platform, the crane 10 can be brought into balance by adjusting the length of the front segment and/or the back segments of the tubes. The operator steps into the hip belt 34 and secures the crane 10 onto the hips, optionally with the help of one or more assistants. As the left and right side hip shells 48 move inwardly, the tubes correspondingly slide inwardly on the tilt shaft 20 and rear axles 74. The hip belt 34 is secured onto the operator's hips using the latch 52.

A monitor screen 80 may be attached to the crane, as shown in FIG. 2, or the operator may use monitor goggles or eyewear 84, to monitor what the camera sees. A cable 82 connects the batteries or other accessories with the camera 15, and to the monitor 80 or eyewear 84. The operator may lift or lower the camera by pulling up or pushing down on the handles 22, or on the tubes 26 and 28. If the camera is well balanced and the front bearing collars have sufficiently low friction, the camera platform and the camera may remain level via inertia during this movement.

Alternatively, the operator can manually keep the camera level, or perform a desired tilt axis movement, by rotating the tilt shaft 20 via the handle 22. Instead of positioning the center of gravity of the loaded camera platform on the axis B-B shown in FIG. 1 passing through the shafts 20, the center of gravity may be off set below the axis B-B. The loaded camera platform then acts as a pendulum and is self-leveling. The operator may perform a panning movement by twisting at the hips, or by turning using the legs. The inertia of the crane 20 allows for smooth and steady panning movement.

As described, the crane 10 is capable of providing a wide range of camera positions and movements. The crane 10 is also relatively easy to use, even for operators having less skill and/or strength. The crane 20 including the camera 15 and the batteries 70 may weigh about 54 to 80 pounds, with the crane 20 alone typically weighing between 5 and 15 pounds.

Figure 3:
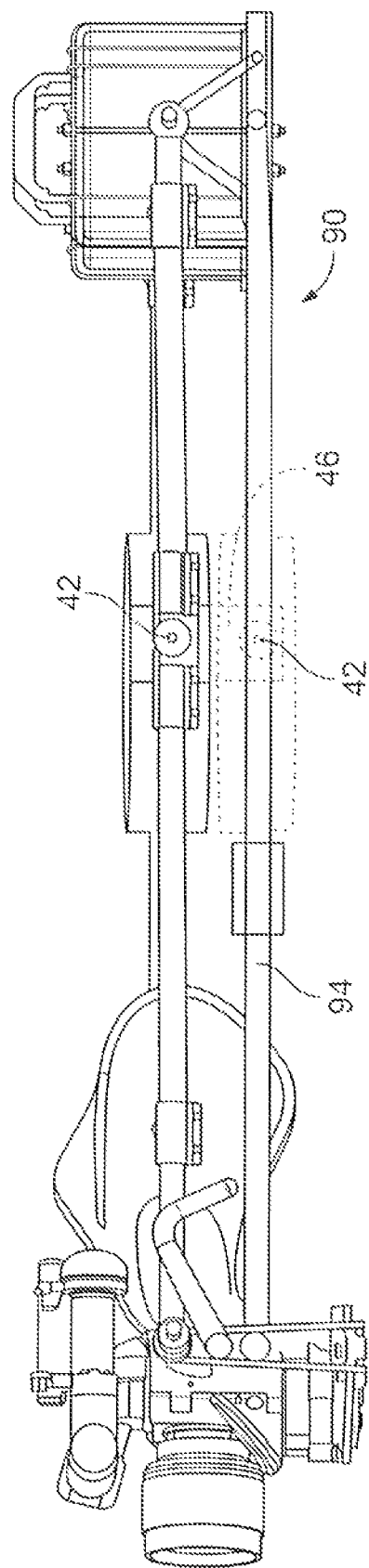
FIG. 3 is a side view of an alternative design.

FIG. 3 shows an alternative design including a leveling tube 94 pivotally attached to the camera platform and to the accessory platform to form a parallelogram 90. The parallelogram, if used, automatically keeps the camera platform level as the crane 20 is rotated up or down about the axis A-A passing laterally through the axles 42, as shown in FIG. 1. In this design the leveling tube 94 is below the main tubes 26 and 28. A leveling tube 94 may be provided on one side or on both sides of the crane arm.

FIG. 6 shows another embodiment 90 with the rear tubes removed from the design shown in FIG. 1, or omitted entirely. In this design, since the crane 90 does not extend at all behind the user, the user requires minimal rear clearance. For example, with the crane 90 the user can back up next to a wall. With this design, since the crane 90 is not balanced, the user holds up the crane by grasping the handles 22 or the front section 30 of the tubes. A torsion spring 92 may be provided on each side to exert upward torque on the front section 30 of the tubes, to reduce the force required to hold up the crane 90.

Figure 7:
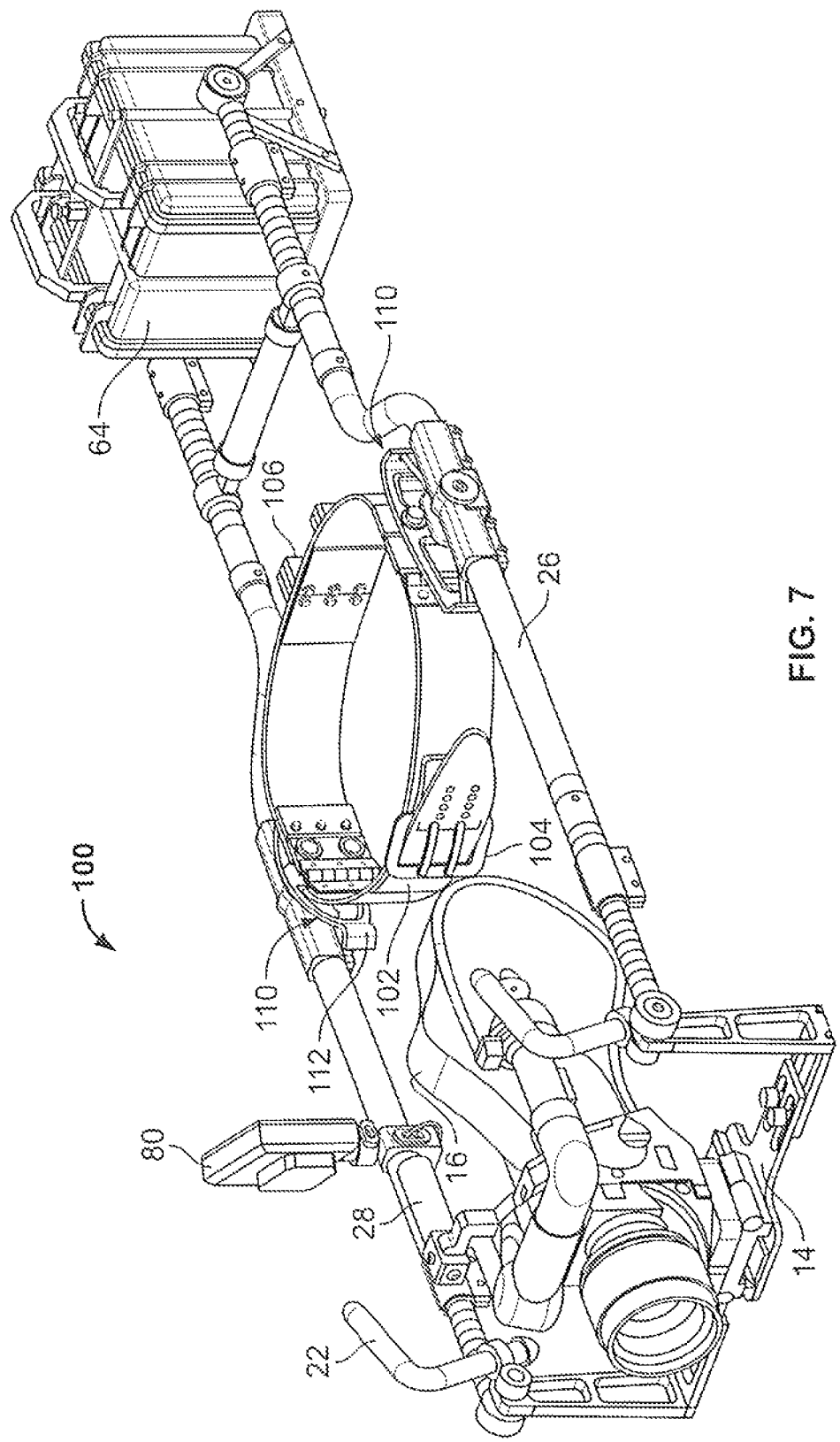
Figure 8:
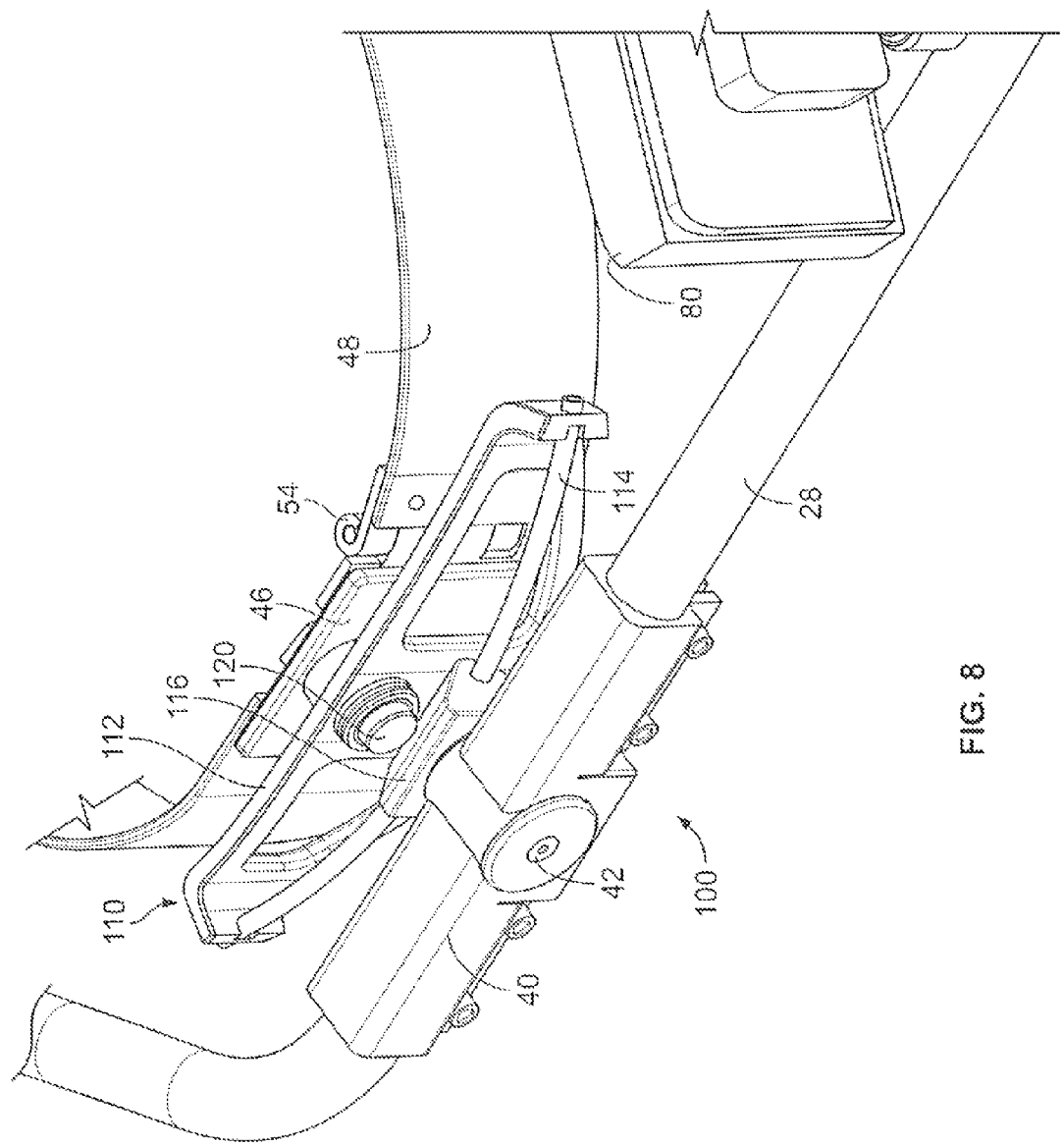
FIG. 8 is an enlarged detail view of the pan segment assembly shown in FIG. 7.
Figure 9:
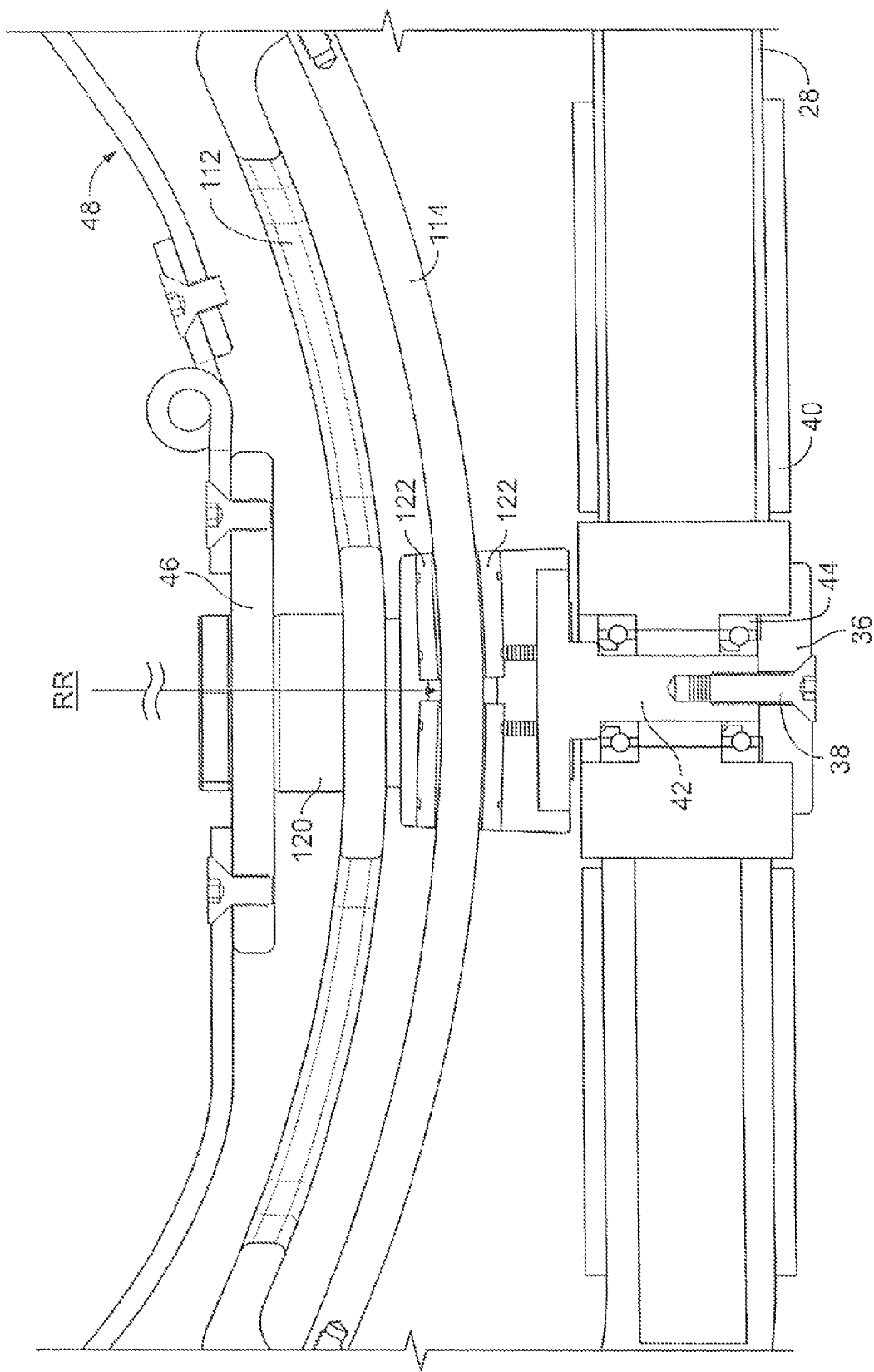
FIG. 9 is a top down section view of the pan segment assembly shown in FIG. 8.

As shown in FIGS. 7-9, an alternative crane 100 may be similar to the crane 10 described above, but further includes a pan segment assembly 110 between tube housing 40 and the left and right side tubes 26 and 28. The pan segment assemblies 110 allow the camera platform 14 to remain stable in the pan axis, even if the user's hips swing while walking or running with the crane 100. Correspondingly, the pan segment assemblies 110 allow the user to pan the crane 100, i.e., to move the crane in the pan axis, without moving the user's hips or legs. The crane 100 may also optionally have a wide belt 102 with a front buckle 104 and a rear space 106 that may be adjusted to fit the user's hip size.

As shown in FIGS. 8 and 9, the pan segment assembly 110 may include a curved rod 114, with the ends of the rod attached to a rod bracket 112. The rod bracket 112 is attached to the hip belt 34 or 102, for example via a bracket tube 120. A follower 116 is slidably supported on the rod 114 by bushings or bearings 122. The rod may have a radius of curvature RR typically ranging from about 7 to 12, 8 to 11, or 9-10 inches. The follower 116 may roll or slide on the rod 114, with the rod 114 having a length allowing from 20 to 60, 30 to 50, or 35 to 45 degrees of pan movement.

In use, the crane 100 operates in the same way as the crane 10 described above. However, the crane 100 allows the operator to perform a limited panning movement, without moving the operator's hips, legs or feet. Specifically, with the operator's lower body remaining stationary, the operator can push and/or pull on the tubes 26 and 28, or on the handles 22, to pan the crane 100. As this occurs, the followers 116 slide or roll on the rods 114 as the crane 100 moves, without any need to move the belt 34 or 102. The crane 100 also helps to isolate the camera platform 14 from unwanted movement or oscillations that may arise from transmission of a user's hip movement to the crane 100. Since with the crane 100, or specifically the tubes 26 and 28 can move independently of the belt, the effect of user's hip movement is reduced or eliminated entirely. Due to the rotational inertia of the crane 100, generally, the crane 100 will experience little or no unwanted pan movement resulting from hip movement. Movement of a user's hips while walking or running therefore does not create unwanted camera movement.

FIGS. 10-23 show another body-mounted crane 200 which is similar or the same as the designs shown in FIGS. 1-9, but having additional features as described below. The crane 200 may be described as having a hip belt 208 which the operator 8 wears similar to the hip belt of a back pack, and having a crane arm 12 which includes all of the components described below that can move relative to the hip belt 208.

Figure 10:
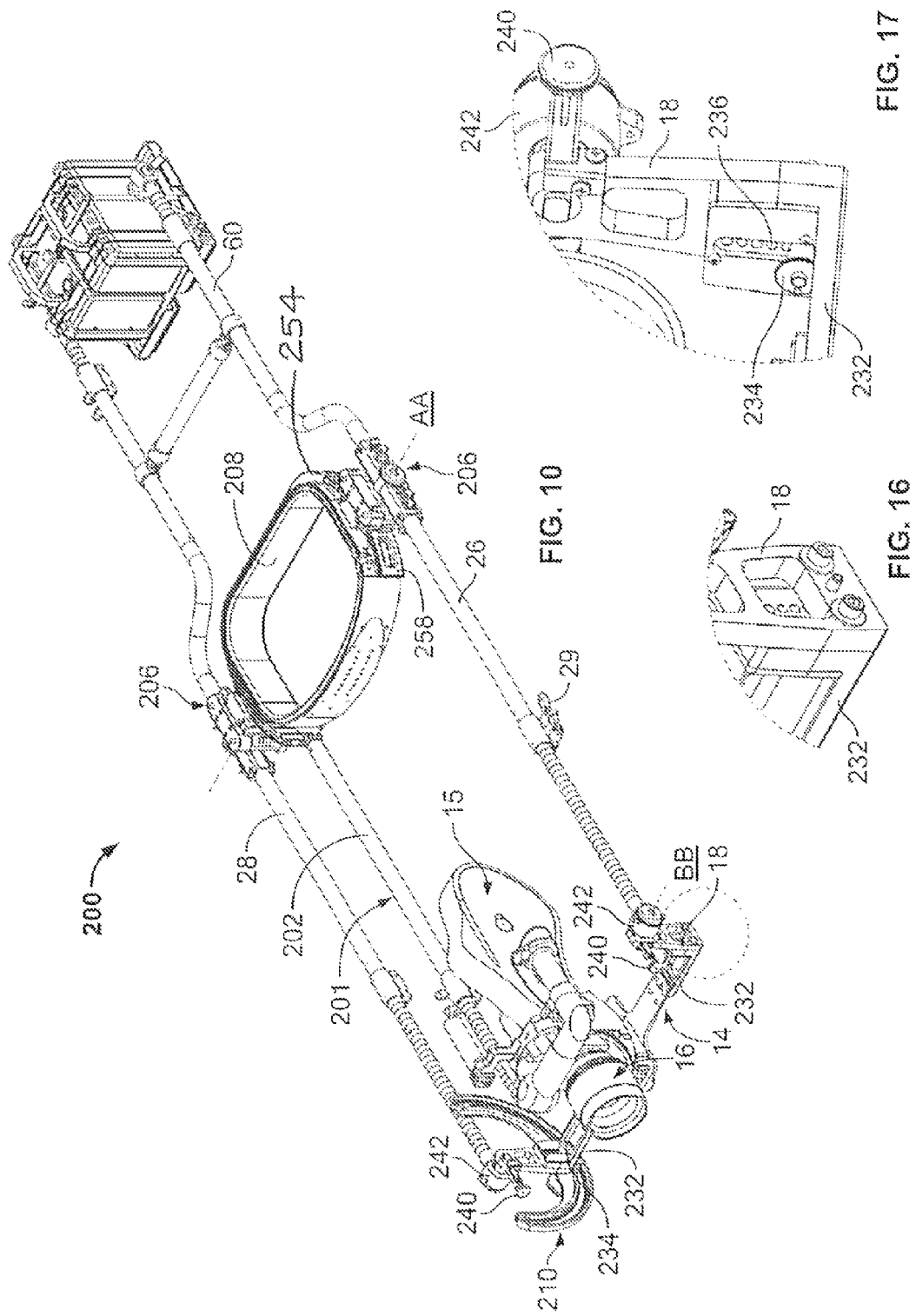
FIG. 10 is a perspective view of an additional alternative design.

As shown in FIGS. 10-12, the crane 200 has a parallelogram linkage 201 on one side to keep the camera platform level as the elevation angle of the crane changes. The parallelogram linkage 201 operates on the same principle as the design shown in FIG. 3, with the following modifications. The parallelogram linkage 201 may be provided only on one side of the crane 200, to reduce the overall weight of the crane 200, while still providing automatic camera platform leveling.

In the parallelogram linkage 201, a leveling link 204 is fixed in position perpendicular to the right side tube 28, for example by rigidly attaching the upper end of the leveling link 204 to the tube housing 40. The rear end of a leveling rod 202 is pivotally attached to the leveling link 204 shown in FIG. 12. The front end of the right side tube 28, and the left side tube 26, are pivotally attached to the camera platform 14, similar to the design shown in FIGS. 2 and 3. However, the front end of the leveling rod 202 is pivotally attached to a tilt plate assembly 210 which can provide a fixed tilt angle.

Figure 14:
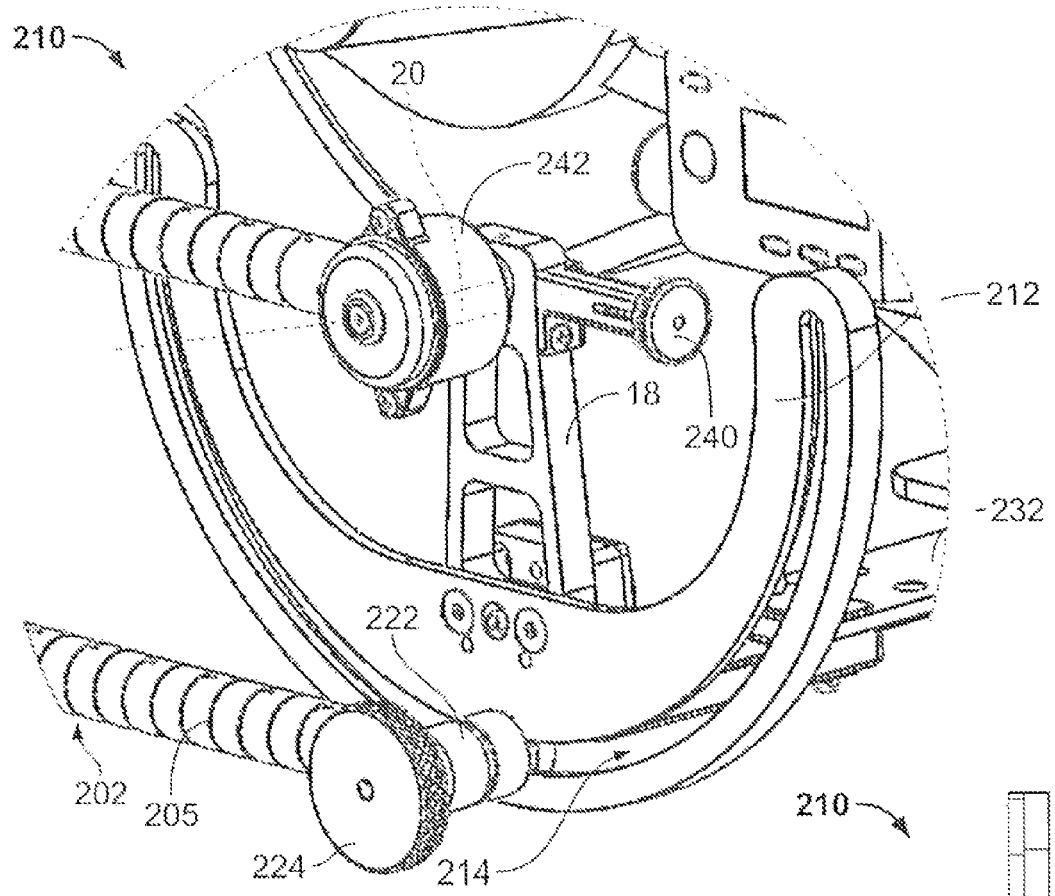
FIG. 14 is a perspective view of the tilt plate assembly shown in FIG. 10.
Figure 15:
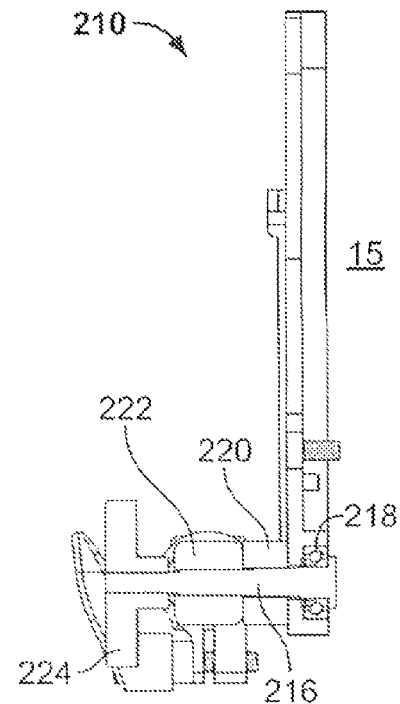
FIG. 15 is a section view of the tilt plate assembly shown in FIG. 14.

Turning to FIGS. 14 and 15, the tilt plate assembly 210 includes a tilt plate 212 having an arc slot 214. The tilt plate 212 is rigidly attached onto the camera platform 14, for example by bolting the tilt plate 212 onto the left side platform arm 18. The arc slot 214 is semi-circular. As shown in FIG. 15, a shaft 216 extends through a shaft block 222 on the front end of the leveling rod 202, through a bushing 220 and through the arc slot 214. A bearing 218 on the inner end of the shaft 216 is captive in a groove on the inside surface of the tilt plate 212. A knob 224 is threaded onto the outer end of the shaft 216. Referring back to FIG. 14, the front ends of the tubes 26 and 28 may be pivotally attached to the camera platform 14 through a combination bearing collar/rotational dampener 242. On each side, the camera platform arm 18 may be rigidly attached to a tilt shaft 20 extending out of the bearing collar 242.

Figure 13:
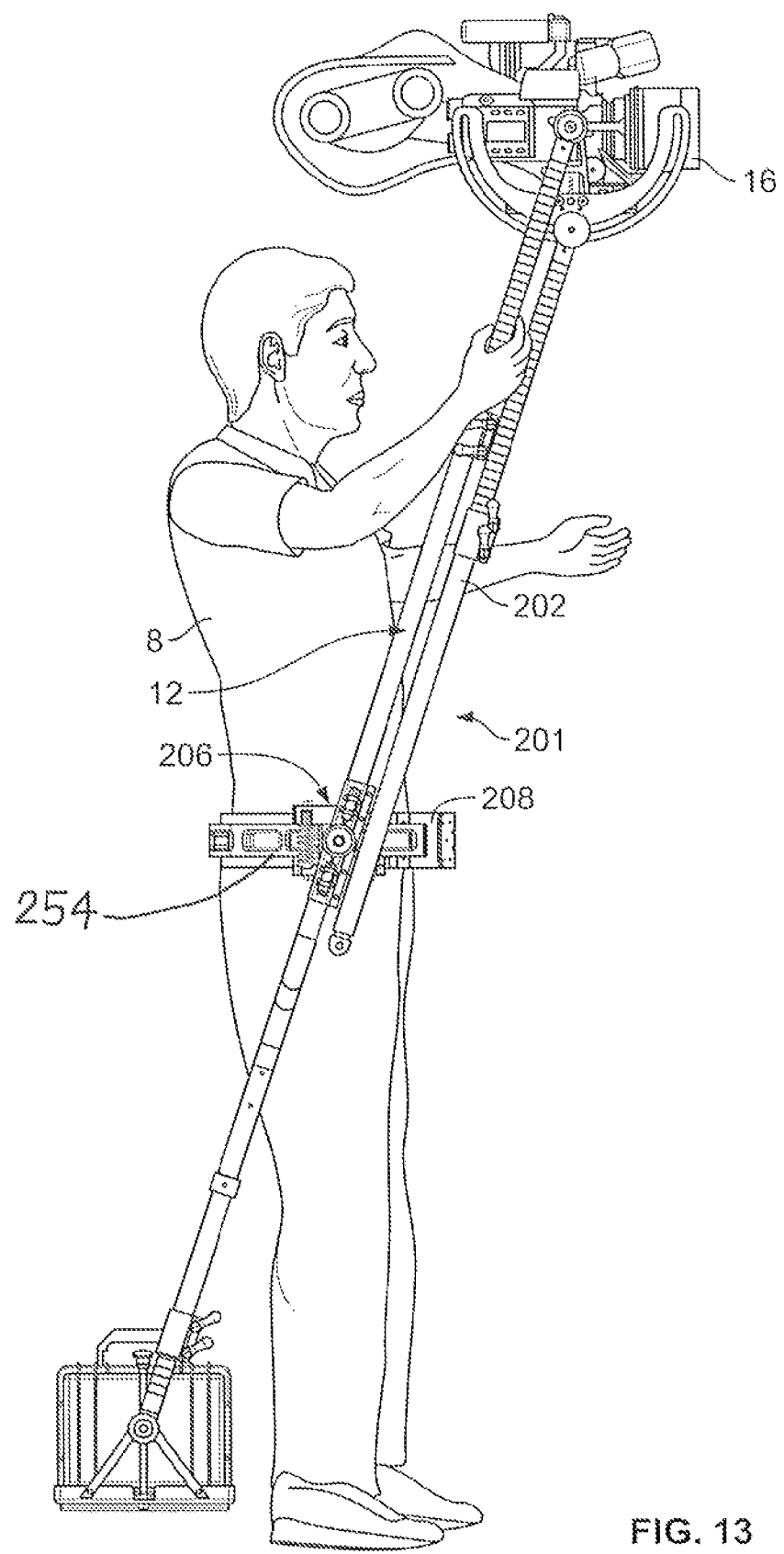
FIG. 13 is a side view of the design shown in FIGS. 10-12 in use.

FIGS. 12 and 13 show the tilt plate assembly configured to position the camera platform 14 in a horizontal orientation, with the lens 16 level. This orientation may be changed to aim the lens at an up or down angle by loosening the knob 224, pivoting the camera platform into a desired position, and then re-tightening the knob 224. With the knob 224 tightened, the tilt plate 212 is clamped between the bushing 222 and the bearing 218 as shown in FIG. 15.

Using the tilt plate assembly avoids the need for the operator to hold the camera platform in a fixed position. For example, if the filmed sequence requires the lens 16 to aimed straight down at the ground at the camera moves forward, the knob 224 is loosened. The camera platform 14 is then tilted to aim the lens straight down. The shaft 216 is then close to the front end of the arc slot 214. The knob 224 is then re-tightened. In this set up, the lens will remain aimed straight down regardless of the elevation angle of the crane arm 12, by operation of the parallelogram leveling linkage formed by adding the leveling rod 202 and the leveling link 204 onto the crane arm.

Referring to FIGS. 10, 14 and 17, the dampeners 242, if used, may be engaged and disengaged via a key shaft moved in and out by a knob 240. This allows the camera platform to pivot in the tilt axis with no dampening, with a moderate amount of dampening by engaging one dampener 242, or with a higher amount of dampening by engaging both dampeners 242. For example, when filming a fixed subject and making slow camera movements, the dampeners 242 may be disengaged, allowing for tilt axis movements with minimal force. When filming a moving subject, for example with the camera operator running along side the subject, the dampeners 242 may be engaged to provide a more stable camera platform.

Referring to FIGS. 16 and 17, the vertical position of the camera mounting plate 232 on the camera platform 18 may be changed aligning one of several vertically spaced apart positioning holes 236 on the mounting plate 232 with a through hole in the platform arm 18 on each side, and then inserting a positioning pin 234. This adjustment allows the center of gravity of the camera 15 (and any other payload on the camera platform 18) to be aligned on the tilt axis BB, reducing the forces needed to hold or rotate the camera platform. Alternatively, to provide a bottom heavy camera platform that is self leveling via a pendulum action, the mounting plate 232 may be positioned lower on the platform arms 18.

As shown in FIG. 10, the crane 200 may be provided with belt connector assemblies 206 on the opposite sides of the belt 208 which provide several functions. Initially, as with the design shown in FIG. 8. the belt connector assemblies 206 may allow the crane arm 12 to pan with the user's hips remaining stationery. The belt connector assemblies 206 also allow raising and lowering the camera platform 14, optionally with dampened movement. The belt connector assemblies 206 may also provide vertical axis shock and vibration isolation.

As shown in FIGS. 10-12, 19 and 24, the hip belt 208 may have a rigid belt frame 254, generally having a C-shape. Upper and lower belt tracks 258 can then be provided on opposite sides of the belt 208. As shown in FIG. 20, the belt connector assembly 206 may include pairs of upper and lower rollers 264 rotatably attached to a lower frame 262. The rollers are captive in and roll in upper and lower belt tracks 258, which may be provided as slots, grooves or rails on the belt frame 254. The bearings used to rotatably attach the rollers to the lower frame 262 may include rotational dampening. The belt tracks 258 curve over a constant radius and may be long enough to allow panning movement of the crane 200 over up to plus/minus 20 to 30 degrees, for a total pan angle of about 60 degrees. This allows panning movement of the crane arm 12 with the operator's hips remaining fixed. Pad material 50 may be attached to the inner surfaces of the belt frame 254 to allow the belt frame to rest comfortably on the operator's hips.

Correspondingly, it allows the operator's hips to move (in azimuth) while the crane arm 12 remains stationary. Hip movement will vary among operators, and with the operator's gait. Other factors may also influence hip movement, such as foot positioning, incline/decline, load, etc. It may therefore be difficult or impossible for the operator to limit hip movement to the extent necessary to avoid inadvertent panning of the crane arm 12. By allowing for relative movement between the operator's hips and crane 200, via the belt connectors 206 rolling or sliding on the belt tracks 258, movement of the operator's hips is effectively isolated from the crane arm 12. Consequently, the camera 15 can largely remain in a fixed straight ahead position, with no panning movement, even though the operator's hips may move extensively, as the operator walks or runs with the crane 200.

Figure 18:
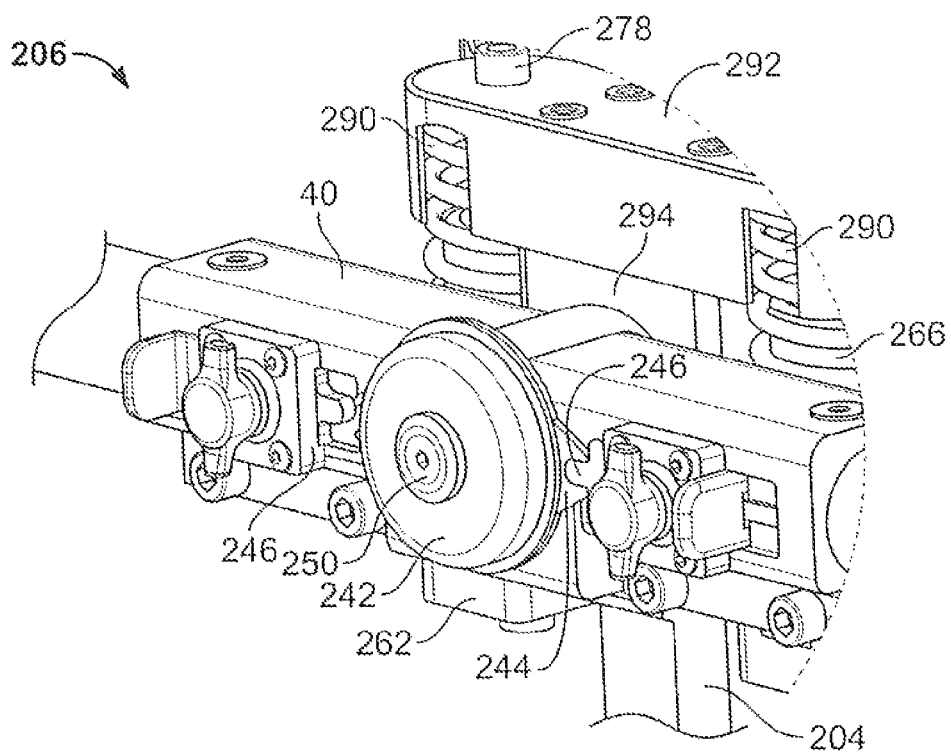
FIG. 18 is an enlarge perspective view of the belt connector assembly shown in FIGS. 10-13.
Figure 19:
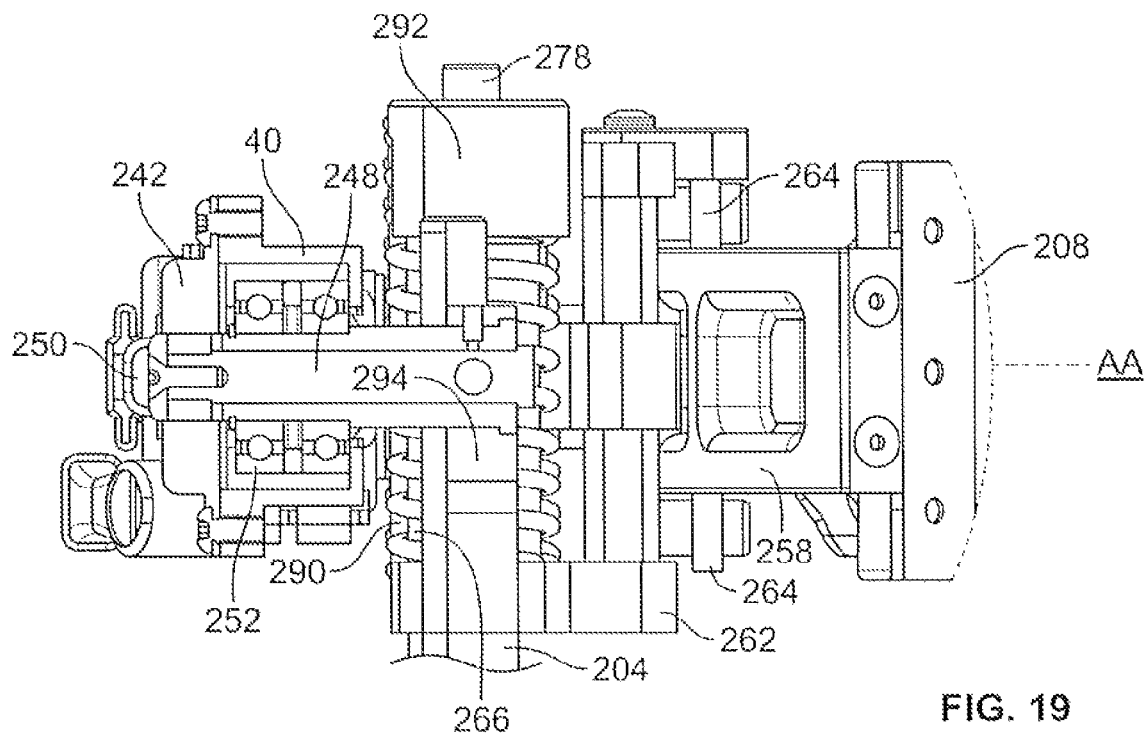
FIG. 19 is a partial section view taken through the shaft of the belt connector assembly shown in FIG. 18.

Referring to FIGS. 18 and 19, the belt connector shaft 248 is attached to a shaft block 294 on the lower frame 262. The tube housing 40 is pivotally supported on the shaft 248 by bearings 252. An inner plate or fitting of a rotary dampener 242 is rigidly attached to the shaft 248. An outer plate or housing 244 of the rotary dampener 242 is engageable by sliders 246 on the tube housing 40. With the sliders 246 withdrawn or pulled back from the outer plate 244, the tube housing 40 pivots freely on the shaft 248. With the sliders 246 engaged to the outer plate 244, the rotary dampener 242 dampens the pivoting movement of the tube housing 40 on the shaft 248. The rotary dampener 242 may be selected to provide a first amount of viscous dampening when one slider is engaged, and a second higher amount of dampening when both sliders are engaged.

Turning to FIGS. 20-23, the belt connector assembly 206 may also provide vertical axis shock and vibration isolation. An upper frame 292 is vertically displacement relative to the lower frame 262. Specifically, sleeves 288 on the upper frame 292 slide vertically on slide posts 296 on the lower frame 262. Slide bearings 298 within the sleeves 262 may be used to allow for low friction and/or damped vertical movement between the upper and lower frames.

Compression springs 290 are compressed between the upper and lower frames, with a dampener 260 positioned inside of each spring. The dampener 260 includes a cylinder 266 attached to the lower frame 262 and a piston 268 attached to the upper frame 292. As shown in FIGS. 22 and 23, an extension bore 270 extends through the piston 268. A needle 274 is threaded into the upper end of piston 268. The conical lower tip of the needle 274 is moveable towards and away from an extension valve seat 280 by turning a needle socket or screw head 278, to adjust the level of dampening provided. The needle 274 is sealed within a needle bore in the piston 268 via a needle o-ring 276. At the lower end of the piston 268, a check ball 284 is confined in a space above a return port 282 by a ball retainer 286. The springs are selected so that when loaded with the weight of the crane arm 12 and a typical camera payload, the pistons 268 are at a nominal mid-point of the cylinders.

The crane arm 12 is effectively suspended on the belt 208 via the springs 290. The belt connector assemblies 206 provide vertical isolation via operation of the springs 290 and dampeners 260. With an upward shock impulse on the belt 208, the lower frame moves up with the belt, as the rollers 264 provide a rigid connection between the belt track 258 and the lower frame 262, in the vertical direction. As the lower frame 262 moves up, the springs 290 compress and absorb the impulse. Fluid in each cylinder 266 below the piston 268 flows substantially freely through the bore 270, and also through the return port 282, so that dampening is minimal in the direction of spring compression.

After the impulse passes, the springs 290 extend reversing the direction of movement of the piston 268 in the cylinder 266. The ball 284 moves into the return port 282 via fluid movement. This leaves only the bore 270 open for fluid to return into the chamber formed below the piston, so that fluid flow is restricted, providing a dampened return movement. The dampening largely prevents oscillation between the upper and lower frames and allows the springs to return to their initial positions with minimal overshoot. The operation of the dampeners 260 is similar for a downward shock impulse on the belt. The vertical isolation provided by the belt connectors 206 reduces peak impulse loads on the operator's hips while also providing a more stable camera platform.

FIGS. 25-27 show a design similar to FIGS. 10-24 further including tilt handles 302 rotatably attached onto slide blocks 304 on the tubes. A belt 306 extends around a pulley 308 attached to the handle 302, and also around a pulley attached to the tilt shaft 20. In use, the slide blocks 304 are slid back on the tubes until the belts 306 are tightened. The slide blocks 304 are then locked in place on the tubes. The camera operator can then tilt the camera platform by twisting the handles 302. Although two mirror image handles 302 are shown, the camera crane may also be used with a tilt handle 302 on one side only.

In each of the designs described, unlike other body-mounted camera supports, the crane does not require any springs to support the camera platform (excluding the isolation springs 290. The designs described also not require any linear dampening elements. Moreover, it is not necessary for any part of the crane to extend above the users shoulders or head, or to contact or apply load onto the users back. The crane 20 can also easily obtain very high or very low lens positions, which is generally not available with existing body-mounted systems.

In a basic form, a camera crane may include only a hip belt, tubes pivotally attached to the hip belt and a camera platform pivotally attached at the front ends of the tubes for tilt axis movement. The other elements and assemblies shown and described may or may not be used. In addition, the elements and assemblies shown on both the left and right sides of the cranes may also optionally be used on one side only. Although the cranes are shown as symmetrical about a longitudinal centerline, this symmetry is not required.

Thus, a novel camera crane has been shown and described. Various changes and substitutions may of course be made, without departing from the spirit and scope of the invention. The invention, therefore, should not be limited except by the following claims and their equivalents.

The invention claimed is:
1. A body-mount camera crane, comprising:
left and right tubes;
a front platform pivotally attached to the front ends of the left and right tubes via front left and right pivot joints;
a rear platform pivotally attached to the back ends of the left and right tubes via back left and right pivot joints; and a hip belt pivotally attached to the left and right tubes at an intermediate position via intermediate left and right pivot joints between the front and back ends of the left and right tubes.

2. The body-mount camera crane of claim 1 with the intermediate pivot joints including left and right intermediate axles on left and right hip belt plates, and with the left and right tubes pivotally attached to the left and right intermediate axles, respectively.

3. The body-mount camera crane of claim 2 with the left and right axle plates attached to left and right rigid hip shells, respectively, and further including a padding material on the left and right hip shells.

4. The body-mount camera crane of claim 1 with the front left and right pivot joints including left and right tilt axles attached to the camera platform, and extending through left and right bearing collars at the front ends of the left and right tubes, and with left and right tilt handles attached to the left and right tilt axles, respectively, for tilting the camera platform.

5. The body-mount camera crane of claim 4 with the left and right bearing collars slidable laterally on the left and right tilt axles, respectively.

6. The body-mount camera crane of claim 1 further including a shoulder harness attached to the hip belt or to the left and right tubes.

7. The body-mount camera crane of claim 1 with the left and right tubes each having a front telescoping section for adjusting the spacing between the camera platform and the hip belt.

8. The body-mount camera crane of claim 7 with the left and right tubes each having a rear telescoping section for adjusting the spacing between the accessory platform and the hip belt.

9. The body-mount camera crane of claim 1 with the rear left and right pivot joints including left and right rear axles attached to the rear platform, and extending through left and right bearing collars at the back ends of the left and right tubes.

10. The body-mount camera crane of claim 1 with the dimension between the front pivot joints and the intermediate pivot joints ranging from 18 to 48 inches.

11. The body-mount camera crane of claim 1 with the hip belt pivotally attached to the left and right tubes via left and right belt connectors, respectively, and with each belt connector having rollers rolling on a track on the belt.

12. The body-mount camera crane of claim 1 with the hip belt pivotally attached to the left and right tubes via left and right rotary dampeners.

13. The body-mount camera crane of claim 1 with the hip belt pivotally attached to the left and right tubes via left and right belt connectors, respectively, and with each belt connector having at least one vertical spring and a dampener.

14. The body-mount camera crane of claim 13 with the spring surrounding the dampener.

15. The body-mount camera crane of claim 1 further including a leveling link having an upper end fixed perpendicularly to the left or right tube, and a leveling rod pivotally attached to a lower end of the leveling link and to the camera platform.

16. The body-mount camera crane of claim 15 further comprising a tilt plate having an arc slot attached to the camera platform, and with the leveling rod pivotally attached to the tilt plate.

17. A body-mount camera crane, comprising:
left and right tubes;
a camera platform pivotally attached to the front ends of the left and right tubes via front left and right pivot joints;
an accessory platform pivotally attached to the back ends of the left and right tubes via back left and right pivot joints; and
left and right side pan segment assemblies pivotally attached to the left and right tubes; and
a hip belt pivotally attached to the left and right side pan segment assemblies.

18. The body-mount camera crane of claim 17 with the left and right side pan segment assemblies each including a curved rod attached to a bracket supported by the hip belt, and a follower slidable along the curved rod, with the left and right tubes attached to the follower of the left and right side pan segment assemblies, respectively.

19. A camera crane, comprising:
a crane arm including:
left and right tubes;
a front platform pivotally attached to the front ends of the left and right tubes via front left and right pivot joints;
a rear platform pivotally attached to the back ends of the left and right tubes via back left and right pivot joints; and
a hip belt, with the crane arm pivotally attached to the hip belt about a horizontal axis.

20. The camera crane of claim 19 further including a sliding or rolling attachment between the crane arm and the hip belt to allow panning movement of the crane arm relative to the hip belt.

* * * * *